US012703360B2

(12) United States Patent
Ge et al.

(10) Patent No.: US 12,703,360 B2
(45) Date of Patent: Aug. 11, 2026

(54) LANE DEPARTURE MONITORING METHODS AND APPARATUSES

(71) Applicant: Robert Bosch GmbH, Stuttgart (DE)

(72) Inventors: Peng Ge, Suzhou (CN); Xiaowen Yang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 19/040,575

(22) Filed: Jan. 29, 2025

(65) Prior Publication Data

US 2025/0249900 A1 Aug. 7, 2025

(30) Foreign Application Priority Data

Feb. 2, 2024 (CN) ......................... 202410153275.2

(51) Int. Cl.

| | |
|---|---|
| ***B60W 30/12*** | (2020.01) |
| ***B60W 30/14*** | (2006.01) |
| ***B60W 50/00*** | (2006.01) |
| ***B60W 50/14*** | (2020.01) |
| ***B60W 60/00*** | (2020.01) |

(52) U.S. Cl.

CPC .......... *B60W 30/12* (2013.01); *B60W 30/146* (2013.01); *B60W 50/0097* (2013.01); *B60W 50/14* (2013.01); *B60W 60/0053* (2020.02); *B60W 60/0057* (2020.02); *B60W 2520/10* (2013.01); *B60W 2520/125* (2013.01)

(58) Field of Classification Search

CPC .............................. B60W 30/12; B60W 50/14
See application file for complete search history.

(56) References Cited

U.S. PATENT DOCUMENTS

| | | | | |
|---|---|---|---|---|
| 9,643,650 | B2 * | 5/2017 | Sim | B60K 31/0008 |
| 10,984,260 | B2 * | 4/2021 | Song | B60W 60/0059 |
| 11,320,284 | B2 * | 5/2022 | Hayee | B62D 15/025 |
| 11,891,060 | B2 * | 2/2024 | Kim | G06V 20/588 |
| 2018/0290666 | A1 * | 10/2018 | Ichikawa | B60W 50/0097 |
| 2019/0100200 | A1 * | 4/2019 | McNew | B60W 40/00 |
| 2019/0202455 | A1 * | 7/2019 | Guecker | B60W 50/14 |
| 2019/0308617 | A1 * | 10/2019 | Groult | B60W 30/09 |
| 2020/0207353 | A1 * | 7/2020 | Chen | B60W 30/18163 |
| 2021/0309192 | A1 * | 10/2021 | Balogh | B60T 8/17557 |

(Continued)

*Primary Examiner* — Long T Tran

(74) *Attorney, Agent, or Firm* — Maginot, Moore & Beck LLP

(57) ABSTRACT

A lane departure monitoring method includes (i) calculating the lateral offset of the vehicle at the reaction time, (ii) predicting whether the vehicle will depart from the lane under the control of an autonomous or assisted driving system according to the calculated lateral offset, (iii) after predicting that the vehicle will depart from the lane, calculating the maximum lateral offset of the vehicle relative to the left lane line or the right lane line based on the lateral acceleration limit value and the lateral acceleration gradient limit value, (iv) again predicting whether the autonomous driving system or assisted driving system can control the vehicle within the lane according to the maximum lateral offset, and (v) based on the result of the second prediction, decelerating the vehicle and/or sending an alert signal to the driver. Also disclosed is a lane departure monitoring apparatus, computer-readable storage media, computer program products, and a domain controller for a vehicle.

15 Claims, 3 Drawing Sheets

(56) References Cited

U.S. PATENT DOCUMENTS

| | | | | |
|---|---|---|---|---|
| 2022/0135039 | A1* | 5/2022 | Jardine | B60W 30/18163 701/26 |
| 2023/0052137 | A1* | 2/2023 | Choi | B60W 40/04 |
| 2024/0174230 | A1* | 5/2024 | Saito | B60W 30/143 |

* cited by examiner

LANE DEPARTURE MONITORING METHODS AND APPARATUSES

This application claims priority under 35 U.S.C. § 119 to application no. CN 2024 1015 3275.2, filed on Feb. 2, 2024 in China, the disclosure of which is incorporated herein by reference in its entirety.

The present application relates to the field of lateral monitoring of vehicles, and more particularly, relates to lane departure monitoring methods and apparatuses, computer-readable storage media, computer program products, and domain controllers for a vehicle.

BACKGROUND

For L2 level autonomous driving, the autonomous driving system or driver-assistance system should always provide lateral control to keep the vehicle within the lane. If the system is unable to control the vehicle within the lane, the system will issue an alert to the driver to take control.

However, there may be strong crosswinds, strong road disturbances, sharp bends, or other factors that interfere with lateral control when the autonomous driving system or driver-assistance system is running. In these extreme cases, the system may not be able to control the vehicle to remain within the lane without the intervention of the driver. Particularly for "hands-free" driver-assistance systems, since the driver's hands are not on the steering wheel, the driver still needs some time to place their hands on the steering wheel and some additional time to take over the vehicle when a takeover is required. If the alert is triggered too late, the driver may not be able to operate the vehicle in time to keep it within the lane to avoid collisions with other vehicles or objects. On the other hand, if the alert is triggered too early, the system is too sensitive, affecting its usability.

SUMMARY

One or more examples of the present application provide for a lane departure monitoring scheme that takes into account the reaction time of the driver's takeover of the steering wheel in order to trigger an alert for the driver to promptly take over the vehicle when necessary (e.g., a visual and/or audible alert via a human-machine interface).

According to one aspect of the present application, a method for lane departure monitoring of vehicles is provided, wherein the method comprises: calculating the lateral offset $d_{lat_react}$ of the vehicle at the reaction time $t_{react}$; predicting whether the vehicle will depart from the lane under the control of an autonomous or assisted driving system according to the calculated lateral offset $d_{lat_react}$; after predicting that the vehicle will depart from the lane, calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$; again predicting whether the autonomous driving system or assisted driving system can control the vehicle within the lane according to the maximum lateral offset $d_{lat\_max}$; and based on the result of the second prediction, decelerating the vehicle and/or sending an alert signal to the driver.

In addition to or in place of the solution described above, in the method described above, decelerating the vehicle and/or sending an alert signal to the driver based on the result of the second prediction comprises: decelerating the vehicle when the autonomous driving system or assisted driving system is able to control the vehicle within the lane; and when the autonomous driving system or assisted driving system is unable to control the vehicle within the lane, sending the driver the alert signal to request takeover while the vehicle is being decelerated.

As a supplement to or replacement of the above solution, in the above method, calculating the lateral offset $d_{lat_react}$ of the vehicle at the reaction time $t_{react}$ comprises calculating the lateral offset $d_{lat_react}$ according to the following equation:

$$d_{lat\_react} = v_{lat} * t_{react} + \frac{a_{actlat} * t_{react}^2}{2},$$

wherein $v_{lat}$ represents the lateral speed of the vehicle, $a_{actlat}$ represents the lateral acceleration of the vehicle, and $t_{react}$ represents the reaction time at which the driver takes over the steering wheel control.

As a supplement to or replacement of the above solution, in the above method, predicting whether the vehicle will depart from the lane under the control of an autonomous or assisted driving system according to the calculated lateral offset $d_{lat_react}$ comprises: when the following two inequalities are satisfied, it is predicted that the vehicle will not depart from its lane under the control of the autonomous driving system or assisted driving system:

$$d_{lat\_react} - \frac{w}{2} > d_{leftlatborder}, \text{ and } d_{lat\_react} + \frac{w}{2} < d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}$*$t_{react}$ and $v_{long}$ is the longitudinal speed of the vehicle.

As a supplement to or replacement of the above solution, in the above method, after predicting that the vehicle will depart from the lane, calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ comprises: calculating the maximum lateral offset $d_{lat\_max}$ according to the following formula:

$$d_{lat\_max} = \int\int_0^{t_{react}} \alpha(t) dt^2 + v_{long} * t_{react},$$

wherein $v_{lat}$ represents the lateral speed of the vehicle and a(t) is determined according to the following equation:

$$a(t) = \begin{cases} a_{actlat} + j(t) * t, & t < \frac{a_{latlimit} - a_{actlat}}{j_{latlimit}} \\ a_{latlimit}, & t \geq \frac{a_{latlimit} - a_{actlat}}{j_{latlimit}} \end{cases},$$

and wherein t represents the time, $a_{actlat}$ represents the lateral acceleration of the vehicle, $a_{latlimit}$ represents the lateral acceleration limit value of the vehicle, and $j_{latlimit}$ represents the lateral acceleration gradient limit value and the lateral acceleration gradient j(t) is determined according to the following equation:

$$j(t)=\begin{cases} j_{latlimit},\ t<\frac{a_{latlimit}-a_{actlat}}{j_{latlimit}} \\ 0,\ t\geq\frac{a_{latlimit}-a_{actlat}}{j_{latlimit}} \end{cases}.$$

As a supplement to or replacement of the above solution, in the above method, again predicting whether the autonomous driving system or assisted driving system can control the vehicle within the lane according to the maximum lateral offset $d_{lat\_max}$ comprises: When the following two inequalities are satisfied, it is predicted that the autonomous driving system or assisted driving system can control the vehicle within the lane:

$$d_{lat\_react}-\frac{w}{2}>d_{leftlatborder};\text{ and } d_{lat\_react}+\frac{w}{2}<d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}$*$t_{react}$ and $v_{long}$ is the longitudinal speed of the vehicle.

According to another aspect of the present application, an apparatus for lane departure monitoring is provided, the apparatus comprising: A first computing device for calculating the lateral offset $d_{lat_react}$ of the vehicle at the reaction time $t_{react}$; a first prediction device for predicting whether the vehicle will depart from the lane under the control of an autonomous or assisted driving system according to the calculated lateral offset $d_{lat_react}$; a second computing device for calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ after predicting that the vehicle will depart from the lane; a second prediction device for again predicting whether the autonomous driving system or assisted driving system can control the vehicle within the lane according to the maximum lateral offset $d_{lat\_max}$; and a control device for decelerating the vehicle and/or sending an alert signal to the driver based on the result of the second prediction.

As a supplement or alternative to the solution described above, in the above apparatus, the control device is configured to: decelerate the vehicle when the autonomous driving system or assisted driving system is able to control the vehicle within the lane; and when the autonomous driving system or assisted driving system is unable to control the vehicle within the lane, send the driver the alert signal to request takeover while the vehicle is being decelerated.

As a supplement or alternative to the solution described above, in the above apparatus, the first computing device is configured to calculate the lateral offset according to the following equation $$d_{lat\_react}:\ d_{lat\_react}=v_{lat}*t_{react}+\frac{a_{actlat}*t_{react}^2}{2},$$

wherein $v_{lat}$ represents the lateral speed of the vehicle, $a_{actlat}$ represents the lateral acceleration of the vehicle, and $t_{react}$ represents the reaction time at which the driver takes over the steering wheel control.

As a supplement or alternative to the solution described above, in the above apparatus, the first prediction device is configured to: when the following two inequalities are satisfied, predict that the vehicle will not depart from its lane under the control of the autonomous driving system or assisted driving system:

$$d_{lat\_react}-\frac{w}{2}>d_{leftlatborder}:\text{ and } d_{lat\_react}+\frac{w}{2}<d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}$*$t_{react}$ and $v_{long}$ is the longitudinal speed of the vehicle.

As a supplement or alternative to the solution described above, in the above apparatus, the second computing device is configured to calculate the maximum lateral offset $d_{lat\_max}$ according to the following equation:

$$d_{lat\_max}=\int\int_0^{t_{react}}\alpha(t)dt^2+v_{long}*t_{react}$$

wherein $v_{lat}$ represents the lateral speed of the vehicle and a(t) is determined according to the following equation:

$$a(t)=\begin{cases} a_{actlat}+j(t)*t,\ t<\frac{a_{latlimit}-a_{actlat}}{j_{latlimit}} \\ a_{latlimit},\ t\geq\frac{a_{latlimit}-a_{actlat}}{j_{latlimit}} \end{cases},$$

and wherein t represents the time, $a_{actlat}$ represents the lateral acceleration of the vehicle, $a_{latlimit}$ represents the lateral acceleration limit value of the vehicle, and $j_{latlimit}$ represents the lateral acceleration gradient limit value and the lateral acceleration gradient j(t) is determined according to the following equation:

$$j(t)=\begin{cases} j_{latlimit},\ t<\frac{a_{latlimit}-a_{actlat}}{j_{latlimit}} \\ 0,\ t\geq\frac{a_{latlimit}-a_{actlat}}{j_{latlimit}} \end{cases}.$$

As a supplement or alternative to the solution described above, in the above apparatus, the second prediction device is configured to: When the following two inequalities are satisfied, predicting that the autonomous driving system or assisted driving system can control the vehicle within the lane:

$$d_{lat\_max}-\frac{w}{2}>d_{leftlatborder};\text{ and } d_{lat\_max}+\frac{w}{2}<d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}*t_{react}$ and $v_{long}$ is the longitudinal speed of the vehicle.

According to yet another aspect of the present application, a computer-readable storage medium is provided, the medium comprises instructions, and the instructions, when running, perform the method as described above.

According to yet another aspect of the present application, a computer program product is provided, which comprises a computer program, and the computer program, when executed by the processor, implements the method as described above.

According to yet another aspect of the present application, a domain controller for a vehicle is provided, the domain controller comprising the lane departure monitoring device as described above.

The lane departure monitoring scheme of the present application takes into account the reaction time $t_{react}$ of the driver taking over the steering wheel, calculates the lateral offset $d_{lat_react}$ of the vehicle at the reaction time $t_{react}$, and makes a first prediction of whether the vehicle will depart from its own lane under the control of the autonomous driving system or assisted driving system based on the calculated lateral offset $d_{lat_react}$; if it is predicted the first time that the vehicle will depart from its own lane, the lane departure monitoring scheme of the present application does not trigger an alert immediately, but further calculates the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ and predicts again whether the autonomous driving system or assisted driving system can control the vehicle within its own lane based on the maximum lateral offset $d_{lat\_max}$. Finally, based on the result of the second prediction, the vehicle is decelerated and/or an alert signal is sent to the driver. The solution ensures that the alert is triggered in time to allow the driver to take over while taking into account the reaction time $t_{react}$ of the driver's takeover of the steering wheel; at the same time, the alert is triggered only when necessary to maximize the usability of the autonomous driving system or assisted driving system.

BRIEF DESCRIPTION OF THE DRAWINGS

The foregoing and other objectives and advantages of the present application will become more fully apparent from the following detailed description taken in conjunction with the accompanying drawings, in which identical or similar elements are denoted by the same reference numerals.

DETAILED DESCRIPTION

In the following, a lane departure monitoring solution for vehicles according to various exemplary examples of the present application will be described in detail with reference to the accompanying drawings.

Figure 1:
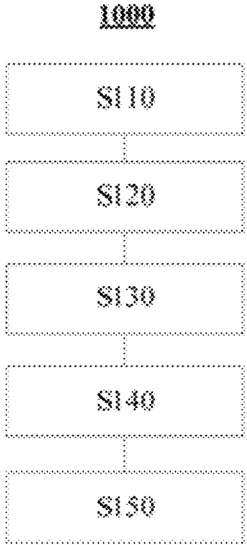
FIG. 1 illustrates a schematic flow diagram of a lane departure monitoring method according to an example of the present application.

FIG. 1 illustrates a schematic flow diagram of a lane departure monitoring method 1000 according to an example of the present application. As shown in FIG. 1, the lane departure monitoring method 1000 comprises:

- in step S110, calculating the lateral offset $d_{lat_react}$ of the vehicle at the reaction time $t_{react}$;
- in step S120, predicting whether the vehicle will depart from the lane under the control of an autonomous or assisted driving system according to the calculated lateral offset$d_{lat_react}$;
- in step S130, after predicting that the vehicle will depart from the lane, calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$;
- in step S140, again predicting whether the autonomous driving system or assisted driving system can control the vehicle within the lane according to the maximum lateral offset $d_{lat\_max}$; and
- in step S150, based on the result of the second prediction, decelerating the vehicle and/or sending an alert signal to the driver.

In the context of this application, the term "reaction time $t_{react}$" denotes the reaction time at which the driver is able to take over control of the steering wheel (or steering control), which is generally a fixed value.

In step S110, the lateral offset $d_{lat_react}$ of the vehicle at the reaction time $t_{react}$ is calculated. In one example, step S110 comprises: Calculating the lateral offset $d_{lat_react}$ according to the following equation:

$$d_{lat\_react} = v_{lat} * t_{react} + \frac{a_{actlat} * t_{react}^2}{2},$$

wherein $v_{lat}$ represents the lateral speed of the vehicle, $a_{actlat}$ represents the lateral acceleration of the vehicle, and $t_{react}$ represents the reaction time at which the driver takes over the steering wheel control. In this way, the calculated lateral offset $d_{lat_react}$ represents the lateral offset that predicts the reaction time $t_{react}$ under the coordinate system of the vehicle. The lateral offset (value) is symbolic, such as right positive and left negative; i.e., if it is predicted that the vehicle will be on the right side of the current position at the reaction time $t_{react}$, the lateral offset value is positive, while if it is predicted that the vehicle will be on the left side of the current position at the reaction time $t_{react}$, the lateral offset value is negative.

in step S120, whether the vehicle will depart from the lane under the control of an autonomous or assisted driving system is predicted according to the calculated lateral offset$d_{lat_react}$. In one example, step S120 comprises: when the following two inequalities are satisfied, it is predicted that the vehicle will not depart from its lane under the control of the autonomous driving system or assisted driving system:

$$d_{lat\_react} - \frac{w}{2} > d_{leftlatborder}; \text{ and } d_{lat\_react} + \frac{w}{2} < d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}*t_{react}$ and $v_{long}$ is the longitudinal speed of the vehicle.

Figure 3:
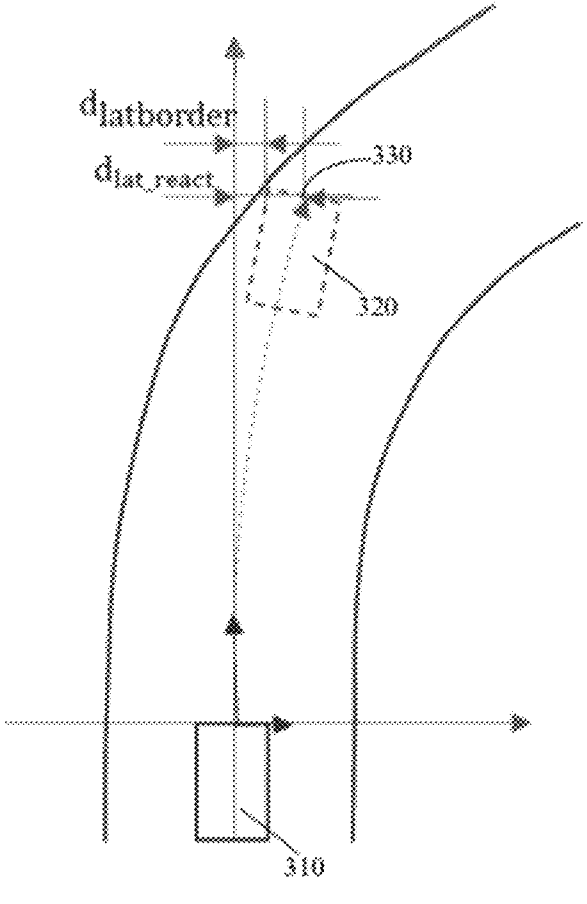
FIG. 3 illustrates a schematic diagram of a model for predicting if a vehicle will depart from the lane under the control of an autonomous driving system or assisted driving system according to an example of the present application.

Referring to FIG. 3, it illustrates a schematic diagram of a model for predicting if a vehicle will depart from the lane under the control of an autonomous driving system or assisted driving system according to an example of the present application. For example, the present vehicle 310 is currently driving within a lane, the vehicle is in the position indicated by the dashed line 320 at the reaction $t_{react}$, and 330 indicates a reference point for calculating $d_{leftlatborder}$ and $d_{rightlatborder}$. As shown in FIG. 3, the designation $d_{lat_react}$ represents the lateral offset of this vehicle at the reaction time $t_{react}$ and the designation $d_{latborder}$ represents the (minimum) lateral offset of the reference point to the (left) lane line/boundary under the coordinate system of this vehicle.

For the left lane line, when the following inequality (1) is satisfied:

$$d_{lat\_react} - \frac{w}{2} > d_{leftlatborder},$$

it can be predicted that the vehicle will not depart from its own lane. While for the right lane line, when the following inequality (2) is satisfied:

$$d_{lat\_react} + \frac{w}{2} < d_{rightlatborder},$$

it can be predicted that the vehicle will not depart from its own lane.

As such, if it is predicted in step S120 that the vehicle will not depart from its lane under the control of an autonomous driving system or assisted driving system, the autonomous driving system or assisted driving system will continue to control the strategy without additional action.

Referring to step S130, after predicting that the vehicle will depart from the lane (e.g., none of the above inequalities (1) and (2) is established), the maximum lateral offset $d_{lat\_max}$ of the vehicle relative to the left lane line or the right lane line is calculated based on the lateral acceleration limit value $a_{latlimit}$ and the lateral acceleration gradient limit value $j_{latlimit}$. In one example, step S130 comprises: calculating the maximum lateral offset $d_{lat\_max}$ according to the following formula:

$$d_{lat\_max} = \int\int_0^{t_{react}} a(t)dt^2 + v_{lat} * t_{react},$$

wherein $v_{lat}$ represents the lateral speed of the vehicle and a(t) is determined according to the following equation:

$$a(t) = \begin{cases} a_{actlat} + j(t) * t, \; t < \frac{a_{latlimit} - a_{actlat}}{j_{latlimit}} \\ a_{latlimit}, \; t \geq \frac{a_{latlimit} - a_{actlat}}{j_{latlimit}} \end{cases},$$

and wherein t represents the time, $a_{actlat}$ represents the lateral acceleration of the vehicle, □$a_{latlimit}$ represents the lateral acceleration limit value of the vehicle, and □$j_{latlimit}$ represents the lateral acceleration gradient limit value and the lateral acceleration gradient j(t) is determined according to the following equation:

$$j(t) = \begin{cases} j_{latlimit}, \; t < \frac{a_{latlimit} - a_{actlat}}{j_{latlimit}} \\ 0, \; t \geq \frac{a_{latlimit} - a_{actlat}}{j_{latlimit}} \end{cases}.$$

In one example, the lateral acceleration limit value $a_{latlimit}$ of the vehicle and the lateral acceleration gradient limit value $j_{latlimit}$ may be determined by an EPS steering torque limit value based on vehicle speed. In one example, the lateral acceleration $a_{actlat}$ of the vehicle, the lateral acceleration limit value $a_{latlimit}$ of the vehicle, and the lateral acceleration gradient limit value $j_{latlimit}$ are all symbolized and are positive on the right and negative on the left under the vehicle coordinate system.

In step S140, whether the autonomous driving system or assisted driving system can control the vehicle within the lane is again predicted according to the maximum lateral offset $d_{lat\_max}$. In one example, step S140 comprises: When the following two inequalities are satisfied, it is predicted that the autonomous driving system or assisted driving system can control the vehicle within the lane:

$$d_{lat\_react} - \frac{w}{2} > d_{leftlatborder}; \text{ and } d_{lat\_react} + \frac{w}{2} < d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}*t_{react}$ and $v_{long}$ is the longitudinal speed of the vehicle.

In step S150, based on the result of the second prediction, the vehicle is decelerated and/or an alert signal is sent to the driver. In one example, step S150 comprises: decelerating the vehicle when the autonomous driving system or assisted driving system is able to control the vehicle within the lane; and when the autonomous driving system or assisted driving system is unable to control the vehicle within the lane (e.g., this may be caused by strong road disturbance, strong crosswinds, or sharp bends) sending the driver the alert signal to request takeover while the vehicle is being decelerated. This enhances the maneuverability of the vehicle and helps it stay within its lane.

In one example, the alert is a visual and/or audible alert issued by a human-machine interface HMI. In one example, the decelerating speed of the vehicle is a comfortable decelerating speed (for the occupants).

Furthermore, it is easily understood by those skilled in the art that the lane departure monitoring method 1000 provided by one or more examples of the present application can be implemented by a computer program. For example, the computer program is contained in a computer program product, and when executed by a processor, implements the lane departure monitoring method 1000 of one or more examples of the present application. For instance, when a computer-readable storage medium (e.g., USB drive) containing the computer program is connected to a computer, running the computer program can implement one or more examples of the lane departure monitoring method 1000 of the present application.

Figure 2:
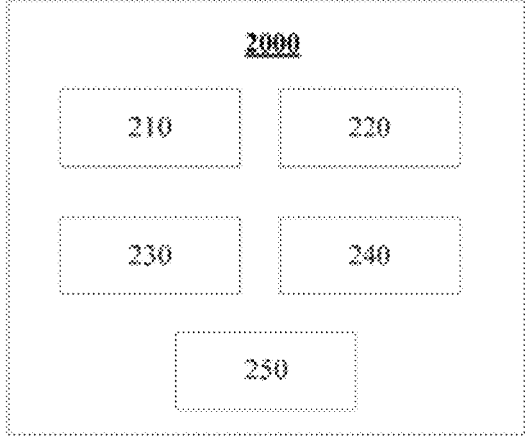
FIG. 2 illustrates a structural schematic diagram of a lane departure monitoring apparatus according to an example of the present application.

Referring to FIG. 2, FIG. 2 illustrates a structural schematic diagram of a lane departure monitoring apparatus 2000 according to an example of the present application. As shown in FIG. 2, the lane departure monitoring device 2000 comprises: A first computing device 210, a first prediction device 220, a second computing device 230, a second prediction device 240, and a control device 250. Comprising a first computing device 210 for calculating the lateral offset $d_{lat_react}$ of the vehicle at the reaction time $t_{react}$; a first prediction device 220 for predicting whether the vehicle will depart from the lane under the control of an autonomous or assisted driving system according to the calculated lateral offset $d_{lat_react}$; a second computing device 230 for calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ after predicting that the vehicle will depart from the lane; a second prediction device 240 for again predicting whether the autonomous driving system or assisted driving system can control the vehicle within the lane according to the maximum lateral offset $d_{lat\_max}$; and a control device 250 for decelerating the vehicle and/or sending an alert signal to the driver based on the result of the second prediction.

In one example, the control device 250 is configured to: decelerate the vehicle when the autonomous driving system or assisted driving system is able to control the vehicle within the lane; and when the autonomous driving system or assisted driving system is unable to control the vehicle within the lane, send the driver the alert signal to request takeover while the vehicle is being decelerated.

In one example, the first computing device 210 is configured to calculate the lateral offset $$d_{lat\_react}:\ d_{lat\_react} = v_{lat} * t_{react} + \frac{a_{actlat} * t_{react}^2}{2}$$

according to the following equation, wherein $v_{lat}$ represents the lateral speed of the vehicle, $a_{actlat}$ represents the lateral acceleration of the vehicle, and $t_{react}$ represents the reaction time at which the driver takes over control of the steering wheel.

In one example, the first prediction device 220 is configured to: when the following two inequalities are satisfied, predict that the vehicle will not depart from its lane under the control of the autonomous driving system or assisted driving system:

$$d_{lat\_react} - \frac{w}{2} > d_{leftlatborder};\ \text{and}\ d_{lat\_react} + \frac{w}{2} < d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}$*$t_{react}$ and $v_{long}$ is the longitudinal speed of the vehicle.

In one example, the second computing device 230 is configured to calculate the maximum lateral offset $d_{lat\_max}$ according to the following equation:

$$d_{lat\_max} = \int\int_0^{t_{react}} \alpha(t)dt^2 + v_{lat} * t_{react},$$

wherein $v_{lat}$ represents the lateral speed of the vehicle and a(t) is determined according to the following equation:

$$a(t) = \begin{cases} a_{actlat} + j(t) * t,\ t < \dfrac{a_{latlimit} - a_{actlat}}{j_{latlimit}} \\ a_{latlimit},\ t \geq \dfrac{a_{latlimit} - a_{actlat}}{j_{latlimit}} \end{cases},$$

and wherein t represents the time, $a_{actlat}$ represents the lateral acceleration of the vehicle, $a_{latlimit}$ represents the lateral acceleration limit value of the vehicle, and $j_{latlimit}$ represents the lateral acceleration gradient limit value and the lateral acceleration gradient j(t) is determined according to the following equation:

$$j(t) = \begin{cases} j_{latlimit},\ t < \dfrac{a_{latlimit} - a_{actlat}}{j_{latlimit}} \\ 0,\ t \geq \dfrac{a_{latlimit} - a_{actlat}}{j_{latlimit}} \end{cases}.$$

In one example, the second prediction device 240 is configured to: When the following two inequalities are satisfied, predict that the autonomous driving system or assisted driving system can control the vehicle within the lane:

$$d_{lat\_max} - \frac{w}{2} > d_{leftlatborder};\ \text{and}\ d_{lat\_react} + \frac{w}{2} < d_{rightlatborder},$$

wherein w is the width of the vehicle, $d_{leftlatborder}$ represents the lateral offset of the reference point relative to the left lane line under the coordinate system of the vehicle, $d_{rightlatborder}$ represents the lateral offset of the reference point relative to the right lane line under the coordinate system of the vehicle, and wherein the reference point refers to the point of the longitudinal distance from the vehicle in the direction of speed $v_{long}$*$t_{react}$ and $v_{long}$ is the longitudinal speed of the vehicle.

The above lane departure monitoring device 2000 may be integrated in one or more examples within a domain controller in an autonomous driving system or assisted driving system (e.g., ADAS).

Figure 4:
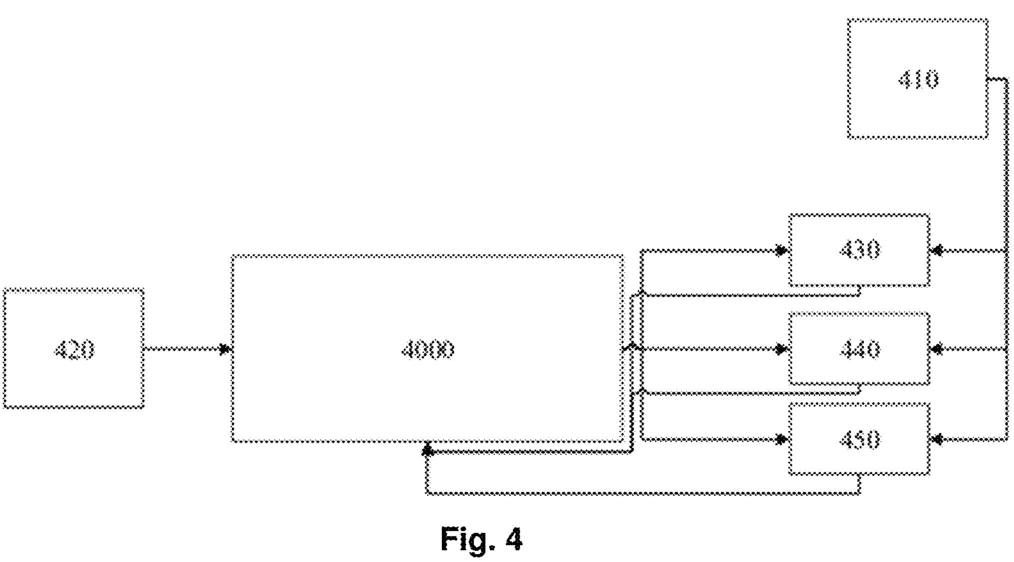
FIG. 4 illustrates a framework diagram of an ADAS system including a domain controller according to an example of the present application.

FIG. 4 illustrates a framework diagram of an ADAS system including a domain controller 4000 according to an example of the present application. As shown in FIG. 4, the domain controller 4000 receives a sensing signal from the sensor cluster 420 (which includes various types of lane-aware sensors) and processes the sensing signal so as to control the brake system 430 (longitudinal control), the powertrain 440 (longitudinal control), and the steering system 450 (lateral control), respectively. In addition, the brake system 430, the powertrain 440, and the steering system 450 also receive operational signals from the driver 410 and feed the dynamic state of the vehicle (wheel speed, lateral acceleration, steering wheel angle, etc.) and driver input (brake pedal state, throttle pedal position, etc.) back to the domain controller 4000.

In one example, the domain controller 4000 includes a perception module, a fusion module, a trajectory planning module, and a trajectory control module. The lane departure monitoring solution of this application may be implemented in a trajectory planning module as well as a trajectory control module.

In summary, the lane departure monitoring scheme of the present application takes into account the reaction time $t_{react}$ of the driver taking over the steering wheel, calculates the lateral offset $d_{lat_react}$ of the vehicle at the reaction time $t_{react}$, and makes a first prediction of whether the vehicle will depart from its own lane under the control of the autonomous driving system or assisted driving system based on the calculated lateral offset $d_{lat_react}$; if it is predicted the first time that the vehicle will depart from its own lane, the lane departure monitoring scheme of the present application does not trigger an alert immediately, but further calculates the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ and predicts again whether the autonomous driving system or assisted driving system can control the vehicle within its own lane based on the maximum lateral offset $d_{lat\_max}$. Finally, based on the result of the second prediction, the vehicle is decelerated and/or an alert signal is sent to the driver. The solution ensures that the alert is triggered in time to allow the driver to take over while taking into account the reaction time $t_{react}$ of the driver's takeover of the steering wheel; at the same time, the alert is triggered only when necessary to maximize the usability of the autonomous driving system or assisted driving system.

The above examples primarily illustrate the lane departure monitoring solution for vehicles of the examples of the present application. Although only some of the examples of the present application have been described, it should be understood by those with ordinary skill in the art that the present application may be implemented in various other forms without departing from its spirit and scope. Therefore, the examples and embodiments presented are illustrative rather than limiting, and the present application may encompass various modifications and replacements without departing from the spirit and scope defined by the various claims.

What is claimed is:

1. A lane departure monitoring method, comprising:

calculating a lateral offset $d_{lat_react}$ of a vehicle at a reaction time $t_{react}$;

predicting whether a vehicle will depart from a lane under control of an autonomous driving system or assisted driving system according to the calculated lateral offset $d_{lat_react}$;

after predicting that the vehicle will depart from the lane, calculating a maximum lateral offset $d_{lat\_max}$ of the vehicle relative to a left lane line or a right lane line based on a lateral acceleration limit value $a_{latlimit}$ and the lateral acceleration gradient limit value $j_{latlimit}$;

again predicting whether the autonomous driving system or assisted driving system can control the vehicle within the lane according to the maximum lateral offset $d_{lat\_max}$; and based on the result of the second prediction, decelerating the vehicle and/or sending an alert signal to the driver.

2. The method of claim 1, wherein decelerating the vehicle and/or sending the alert signal to the driver based on the result of the second prediction comprises:

decelerating the vehicle when the autonomous driving system or assisted driving system is able to control the vehicle within the lane; and when the autonomous driving system or assisted driving system is unable to control the vehicle within the lane, sending the driver the alert signal to request takeover while the vehicle is being decelerated.

3. The method of claim 1, wherein calculating the lateral offset $d_{lat_react}$ of the vehicle at the reaction time $t_{react}$ comprises calculating the lateral offset $d_{lat_react}$ according to the following equation:

$$d_{lat\_react} = v_{lat} * t_{react} + \frac{a_{actlat} * t_{react}^2}{2},$$

wherein $v_{lat}$ represents a lateral speed of the vehicle, $a_{actlat}$ represents a lateral acceleration of the vehicle, and $t_{react}$ represents the reaction time at which the driver takes over the steering wheel control.

4. The method of claim 1, wherein predicting whether the vehicle will depart from the lane under the control of the autonomous driving system or assisted driving system according to the calculated lateral offset $d_{lat_react}$ comprises:

when the following two inequalities are satisfied, predicting that the vehicle will not depart from its lane under the control of the autonomous driving system or assisted driving system:

$$d_{lat\_react} - \frac{w}{2} > d_{leftlatborder}; \text{ and}$$

$$d_{lat\_react} + \frac{w}{2} < d_{rightlatborder},$$

wherein w is a width of the vehicle, $d_{leftlatborder}$ represents the lateral offset of a reference point relative to the left lane line under a coordinate system of the vehicle, $d_{rightlatborder}$ represents the lateral offset of the reference point relative to the right lane line under the coordinate system of the vehicle, and wherein the reference point refers to the point of a longitudinal distance from the vehicle in a direction of speed $v_{long} * t_{react}$, and $v_{long}$ is a longitudinal speed of the vehicle.

5. The method of claim 1, wherein after predicting that the vehicle will depart from the lane, calculating the maximum lateral offset $d_{lat\_max}$ of the vehicle relative to the left lane line or the right lane line based on the lateral acceleration limit value $a_{latlimit}$ and the lateral acceleration gradient limit value $j_{latlimit}$ comprises:

calculating the maximum lateral offset $d_{lat\_max}$ according to the following formula:

$$d_{\text{lat\_max}} = \int\int_0^{t_{react}} a(t)dt^2 + v_{lat} * t_{react}.$$

wherein $v_{lat}$ represents the lateral speed of the vehicle, and a(t) is determined according to the following equation:

$$a(t) = \begin{cases} a_{actlat} + j(t) * t, & t < \frac{a_{latlimit} - a_{actlat}}{j_{latlimit}} \\ a_{latlimit}, & t \geq \frac{a_{latlimit} - a_{actlat}}{j_{latlimit}} \end{cases},$$

and wherein t represents the time, $a_{actlat}$ represents the lateral acceleration of the vehicle, $a_{latlimit}$ represents the lateral acceleration limit value of the vehicle, and $j_{latlimit}$ represents the lateral acceleration gradient limit value, and the lateral acceleration gradient j(t) is determined according to the following equation:

$$j(t) = \begin{cases} j_{latlimit}, & t < \frac{a_{latlimit} - a_{actlat}}{j_{latlimit}} \\ 0, & t \geq \frac{a_{latlimit} - a_{actlat}}{j_{latlimit}} \end{cases}.$$

6. The method of claim 1, wherein again predicting whether the autonomous driving system or assisted driving system can control the vehicle within the lane according to the maximum lateral offset $d_{lat\_max}$ comprises:

when the following two inequalities are satisfied, predicting that the autonomous driving system or assisted driving system can control the vehicle within the lane:

$$d_{lat\_max} - \frac{w}{2} > d_{leftlatborder}; \text{ and}$$

$$d_{lat\_max} + \frac{w}{2} < d_{rightlatborder},$$

wherein w is a width of the vehicle, $d_{leftlatborder}$ represents the lateral offset of a reference point relative to the left lane line under a coordinate system of the vehicle, $d_{rightlatborder}$ represents the lateral offset of the reference point relative to the right lane line under the coordinate system of the vehicle, and wherein the reference point refers to the point of a longitudinal distance from the vehicle in a direction of speed $v_{long}*t_{react}$, and $v_{long}$ is a longitudinal speed of the vehicle.

7. A computer-readable storage medium, wherein the medium comprises instructions that, when executed, perform the method according to claim 1.

8. A computer program product, comprising a computer program, wherein the computer program, when executed by a processor, implements the method according to claim 1.

9. A device for lane departure monitoring of vehicles, comprising:

a first computing device configured to calculate a lateral offset $d_{lat_react}$ of a vehicle at a reaction time $t_{react}$;

a first prediction device configured to predict whether the vehicle will depart from the lane under the control of an autonomous or assisted driving system according to the calculated lateral offset $d_{lat_react}$;

a second computing device configured to calculate a maximum lateral offset $d_{lat\_max}$ of the vehicle relative to a left lane line or a right lane line based on a lateral acceleration limit value $a_{latlimit}$ and a lateral acceleration gradient limit value $j_{latlimit}$ after predicting that the vehicle will depart from the lane;

a second prediction device configured to again predict whether the autonomous driving system or assisted driving system can control the vehicle within the lane according to the maximum lateral offset $d_{lat\_max}$; and a control device configured to decelerate the vehicle and/or send an alert signal to the driver based on the result of the second prediction.

10. The apparatus according to claim 9, wherein the control device is configured to:

decelerate the vehicle when the autonomous driving system or assisted driving system is able to control the vehicle within the lane; and when the autonomous driving system or assisted driving system is unable to control the vehicle within the lane, send the driver the alert signal to request takeover while the vehicle is being decelerated.

11. The apparatus of claim 9, wherein the first computing device is configured to calculate the lateral offset $d_{lat_react}$ according to the following equation:

$$d_{lat\_react} = v_{lat} * t_{react} + \frac{a_{actlat} * t_{react}^2}{2},$$

wherein $v_{lat}$ represents a lateral speed of the vehicle, $a_{actlat}$ represents a lateral acceleration of the vehicle, and $t_{react}$ represents the reaction time at which the driver takes over the steering wheel control.

12. The apparatus according to claim 9, wherein the first prediction device is configured to:

when the following two inequalities are satisfied, predict that the vehicle will not depart from its lane under the control of the autonomous driving system or assisted driving system:

$$d_{lat\_react} - \frac{w}{2} > d_{leftlatborder}; \text{ and}$$

$$d_{lat\_react} + \frac{w}{2} < d_{rightlatborder},$$

wherein w is a width of the vehicle, $d_{leftlatborder}$ represents the lateral offset of a reference point relative to the left lane line under a coordinate system of the vehicle, $d_{rightlatborder}$ represents the lateral offset of the reference point relative to the right lane line under the coordinate system of the vehicle, and wherein the reference point refers to the point of a longitudinal distance from the vehicle in a direction of speed $v_{long}*t_{react}$, and $v_{long}$ is a longitudinal speed of the vehicle.

13. The apparatus of claim 9, wherein the second computing device is configured to calculate the maximum lateral offset $d_{lat\_max}$ according to the following equation:

$$d_{lat\_max} = \int\int_0^{t_{react}} a(t) dt^2 + v_{lat} * t_{react},$$

wherein $v_{lat}$ represents the lateral speed of the vehicle, and a(t) is determined according to the following equation:

$$a(t) = \begin{cases} a_{actlat} + j(t) * t, & t < \frac{a_{latlimit} - a_{actlat}}{j_{latlimit}} \\ a_{latlimit}, & t \geq \frac{a_{latlimit} - a_{actlat}}{j_{latlimit}} \end{cases},$$

and wherein t represents the time, $a_{actlat}$ represents a lateral acceleration of the vehicle, $a_{latlimit}$ represents the lateral acceleration limit value of the vehicle, and $j_{latlimit}$ represents the lateral acceleration gradient limit value, and the lateral acceleration gradient j(t) is determined according to the following equation:

$$j(t) = \begin{cases} j_{latlimit}, & t < \frac{a_{latlimit} - a_{actlat}}{j_{latlimit}} \\ 0, & t \geq \frac{a_{latlimit} - a_{actlat}}{j_{latlimit}} \end{cases}.$$

14. The apparatus according to claim 9, wherein the second prediction device is configured to:

when the following two inequalities are satisfied, predict that the autonomous driving system or assisted driving system can control the vehicle within the lane:

$$d_{lat\_max} - \frac{w}{2} > d_{leftlatborder}; \text{ and}$$

-continued $$d_{lat\_max} + \frac{w}{2} < d_{rightlatborder},$$

wherein w is a width of the vehicle, $d_{leftlatborder}$ represents the lateral offset of a reference point relative to the left lane line under a coordinate system of the vehicle, $d_{rightlatborder}$ represents the lateral offset of the reference point relative to the right lane line under the coordinate system of the vehicle, and wherein the reference point refers to the point of a longitudinal distance from the vehicle in a direction of speed $v_{long}*t_{react}$, and $v_{long}$ is a longitudinal speed of the vehicle.

15. A domain controller for a vehicle, wherein the domain controller includes a lane departure monitoring apparatus according to claim 9.

* * * * *